Jan. 19, 1971 A. H. TIETJEN ET AL 3,555,792
POWER OPERATED LAWN TREATING DEVICE
Filed April 17, 1968 3 Sheets-Sheet 1
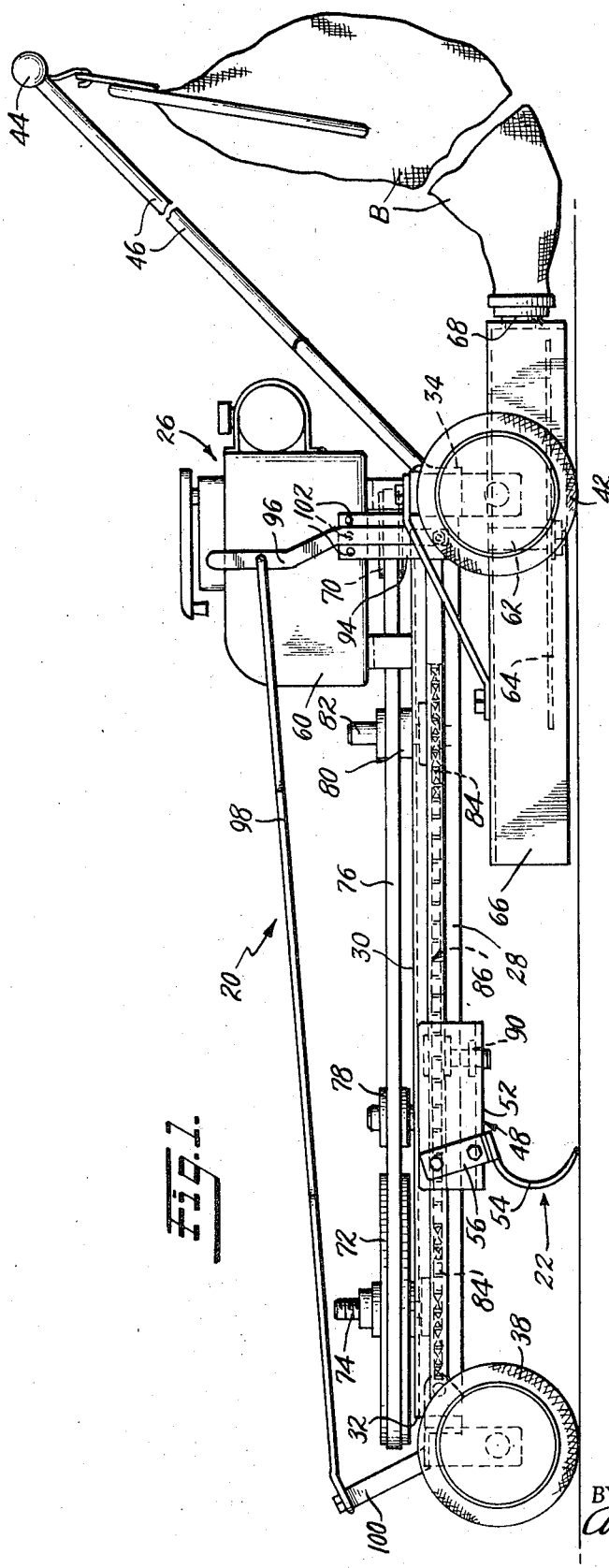
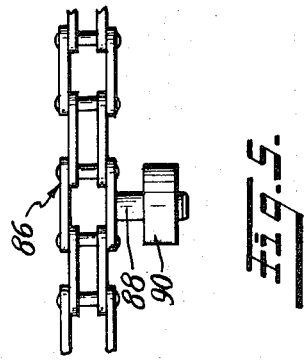
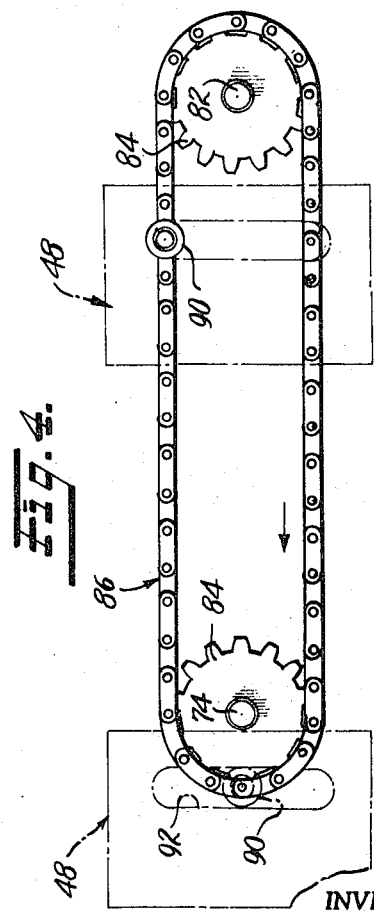
INVENTORS
ALBERT H. TIETJEN
ALBERT G. HEIDTMAN
BY
ATTORNEYS

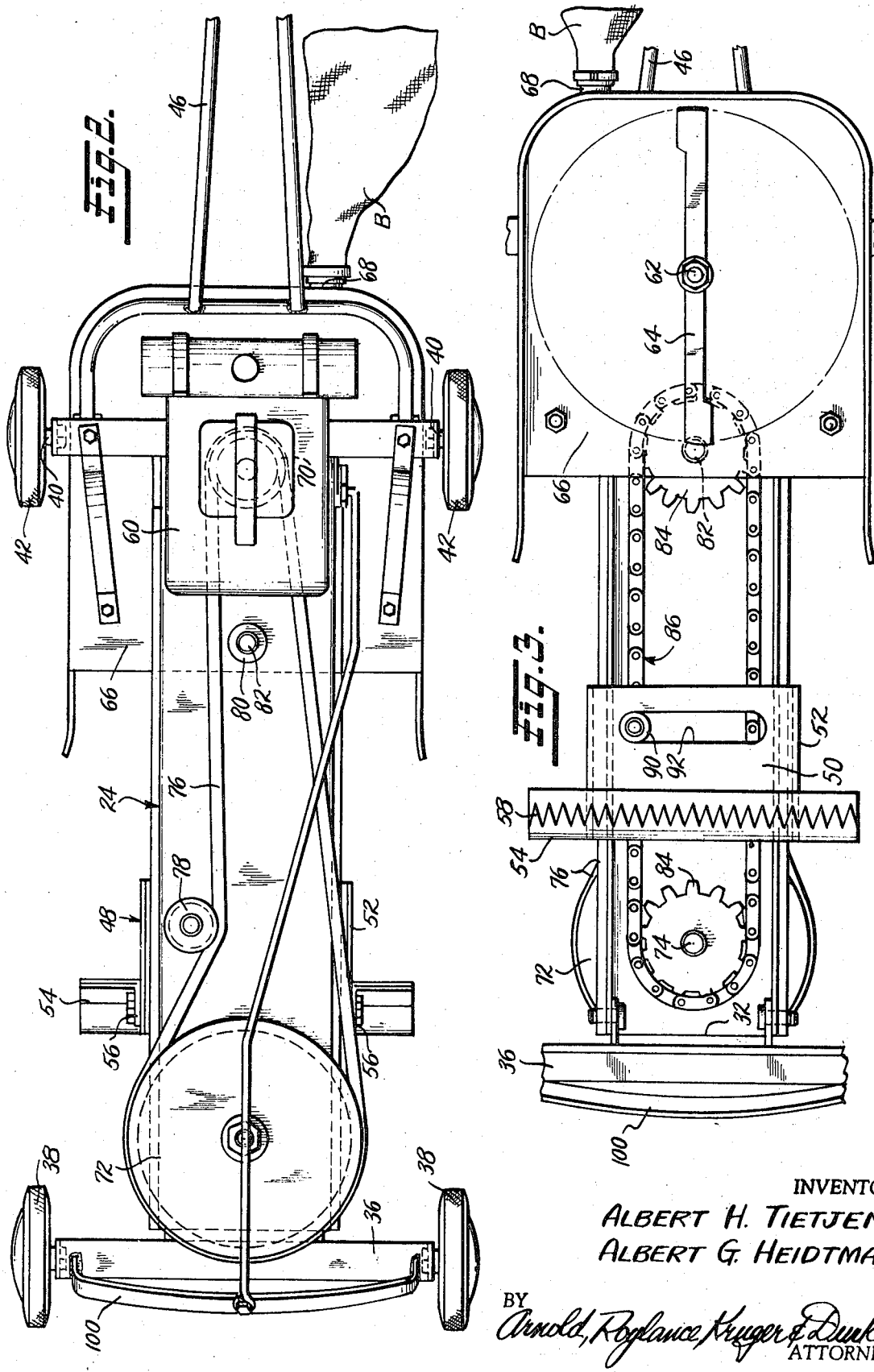

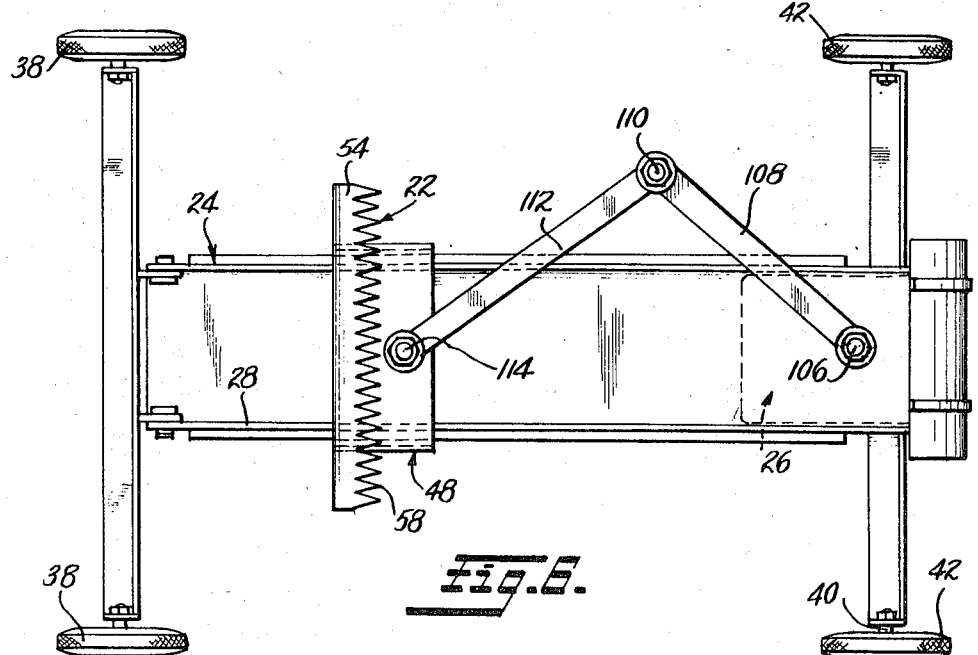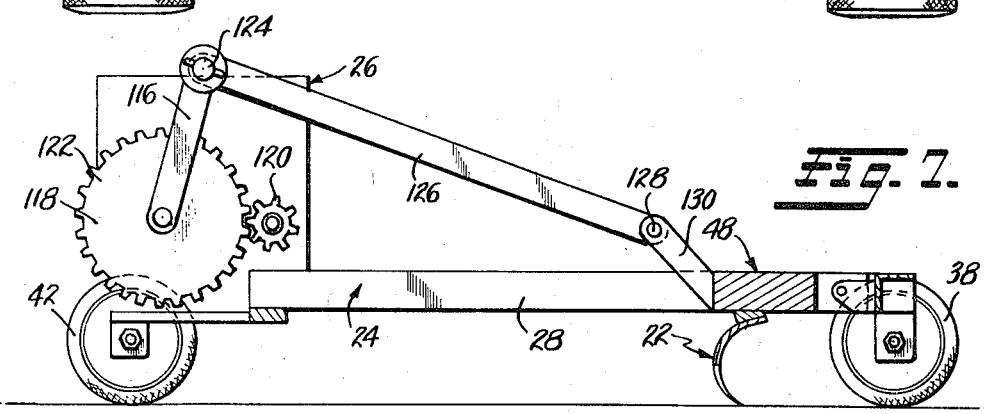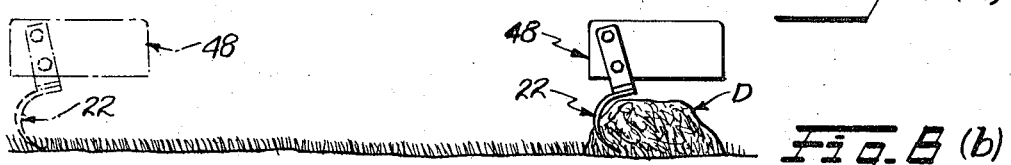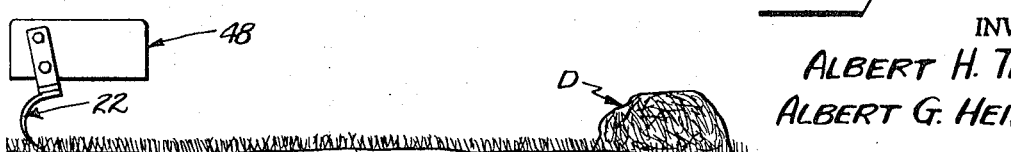

United States Patent Office

3,555,792
Patented Jan. 19, 1971

3,555,792
POWER OPERATED LAWN TREATING DEVICE
Albert H. Tietjen, 515 Colonial Way, and Albert G. Heidtman, 565 Colonial Way, both of Reno, Nev. 89502
Filed Apr. 17, 1968, Ser. No. 722,057
Int. Cl. A01d 35/26
U.S. Cl. 56—25.4                                    5 Claims

ABSTRACT OF THE DISCLOSURE

A power operated lawn treating device wherein a rake is slidably mounted and wherein a power means reciprocably slides the rake between a forward and a rearward position to thus collect dead grass and other debris upon the lawn. The rake is provided with a convex forward surface and a concave rear surface so that the raking action takes place only as the rake is moved from its forward to its rearward position and so that the rake automatically cleans itself as it moves from its rearward to its forward position.

---

This invention relates to a power operated lawn treating device and more particularly it relates to a power operated rake means which can be utilized by itself or in combination with a mower means in lawn care applications.

In the past, some difficulty has arisen in attempting to properly treat and care for grass covered lawns. As used herein, the term "lawn" is not necessarily limited to a residential tract, but instead, comprehends any grass covered expanse of land which may be mowed from time to time. Thus, the present invention could be utilized in connection with golf courses, cemeteries, highway median strips, and so on. On any and all such grass covered tracts of land, there is always a certain amount of dead grass covering the ground, usually below the level of the top of the growing grass. This dead grass, sometimes known as thatch, will often tend to become heavy and matted, if not collected, and will thus prevent proper aeration of the soil in which the grass is growing. In addition to this dead grass which occurs from natural causes such as lack of moisture, lack of sunlight, and so on, there is always at least some additional dead grass in the form of clippings created when the lawn is mowed. Even when the mower collects most of these clippings, there is a certain amount of uncollected clippings which tend to remain below the level of the growing grass. Finally, in addition to the dead grass, there are certain other forms of debris, such as twigs, leaves and other matter which tend to collect on a grassy expanse of land. All of this material can collectively be referred to as "debris" and it will be understood that such term includes dead grass, twigs, leaves and all other bits of matter, other than growing grass, which tend to collect upon a lawn over a period of time.

While many people have recognized the problems associated with collection of such debris on a lawn and have understood that such debris interferes with the normal growth pattern of the grass that prevents the soil from becoming properly aerated, there has not heretofore been a wholly satisfactory solution. There are machines known as thatchers, which, in their usual form, consist of rotary drum members having a series of ground engaging hammers which withdrawn the thatch or debris above the level of the ground, but such thatchers are not widely used and they are certainly not used before each cutting operation. In fact, even if one did want to use a thatcher prior to each lawn mowing operation, the time required for the lawn mowing operation would be at least doubled since the operator would first have to run the thatcher across the entire lawn and would thereafter have to run the mower across the entire lawn. Thus, in most instances, no thatching is performed at all, and instead, the lawn is merely cut by the mower with the clippings being collected subsequent to mowing, either by a mower collection device or by manually raking the lawn. It is, of course, possible to remove such thatch and other debris by manually raking the lawn, but most people only undertake such a manual raking operation after the lawn has been cut, rather than undertaking the same prior to cutting. It is felt that it would be beneficial to perform such a thatching or debris collecting operation prior to the mowing of the lawn so that the live grass can stand freely upright to be severed.

With the foregoing in mind, it is, therefore, an object of the present invention to provide a new and improved lawn treating device wherein a power operated rake means is used to satisfactorily withdraw thatch and other debris from a lawn.

Another object of the present invention is to provide a power operated rake means which will automatically clean itself so that no manual raking or cleaning need be done to remove thatch and other debris from a lawn.

Another object of the present invention is to provide a power operated rake means used in conjunction with a conventional power lawnmower means so that the rake means will withdraw all thatch and debris from the lawn prior to the cutting operation performed by the mower.

Another object of the present invention is to provide a unique form of lawn treatment which can be relatively inexpensively produced and marketed and which will operate satisfactorily for extended periods of time without undo maintenance.

Other objects, advantages and salient features of the present invention will become apparent from the following detailed description, which, taken in conjunction with the annexed drawings, discloses a preferred embodiment thereof.

Referring to the drawings which form a part of this specification:

FIG. 1 is a side elevational view of an assembly in accordance with the principles of the present invention;

FIG. 2 is a top plan view of the apparatus of FIG. 1;

FIG. 3 is a bottom plan view of the apparatus of FIG. 1;

FIGS. 4 and 5 are enlarged fragmentary diagrammatic views illustrating the driving means utilized in the apparatus of FIG. 1;

FIG. 6 is a bottom plan view of a modified form of apparatus;

FIG. 7 is a longitudinal sectional view through still another modified form of apparatus; and FIGS. 8(a), 8(b) and 8(c) are schematic views showing the manner in which the rake means of the present invention collects debris and automatically cleans itself.

Referring now to the drawings, the embodiment illustrated in FIGS. 1-3 combines the power operated rake means of the present invention with a power operated lawn mower. The embodiments of FIGS. 6 and 7 show modified forms of power operated rake means which are not combined with any lawn mowing or cutting means.

Referring to FIGS. 1-3, the apparatus illustrated therein is generally designated 20. Such apparatus includes a rake means generally designated 22, a supporting frame means generally designated 24 and a power means generally designated 26.

The frame means 24 includes a pair of spaced apart longitudinally extending sides 28, each of which can be formed as a depending skirt from a top plate 30. The opposite sides 28 are disposed in parallel relationship with one another to serve as a guide means for the longitudinal reciprocation of the rake means 22 in a manner to be described in detail hereinafter. The frame means include a forward end 32 and a rear end 34, each of which extends between the opposed sides 28. A front axle means 36 extends across the forward end 32 of the frame means and at its outboard end, supports a pair of ground engaging wheels 38 which are laterally displaced some distance beyond the sides 28 of the frame means. A rear axle 40 extends laterally across the frame means somewhat forwardly of the rear end 34 and another pair of ground engaging wheels 42 are mounted on the outboard ends of the rear axle 40. Preferably, each rear wheel 42 is longitudinally aligned with the front wheel 38 on its side of the apparatus and the axles 36 and 40 can be connected and rotatably mounted upon the frame means 24 in any suitable conventional manner. A handle means 44 is connected by a yoke 46 to the rear axle 40 so that when the operator manually pulls the handle, the entire device 20 can be translated or moved along the lawn which is being treated. Moreover, while the handle 44 illustrated herein is primarily intended for manual propulsion of the unit 20, it will be understood that, if desired, a drive means can be engaged between the power means 26 and the rear wheels 42 to drive such rear wheels and hence propel the device 20 by power, as is conventional with power driven lawnmowers.

A carriage means is provided for movably mounting the rake means 22 onto the supporting frame 24 and while such carriage means is generally designated 48, it will be seen that the same includes a generally flat bottom plate 50 which extends across the underside of the frame means 24 and a pair of upturned lateral flanges 52 which ride along the sides 28 of the frame means. Thus, the carriage means 48 is of a generally U-shaped cross-sectional configuration adapted for guided reciprocation along the sides 28 of the frame means 24. A variety of different types of engagement assemblies may be provided between the sides 28 on the frame and the flanges 52 on the carriage. For example, considering one side member 28 on its confronting flange member 52 as a unit, one such member may be provided with a rib while the other such member may be provided with a groove within which the rib fits. Alternatively, one such member may be provided with a series of roller devices and the other such member may be provided with a surface engageable upon and slidable along such roller devices. Still further, either or both such members may be provided with some suitable frictional sliding surface such as a nylon block or the like. It is not considered necessary to illustrate these typical arrangements herein since they are merely conventional well-known expedients used in the art where one surface is to be slidable along another. In any event, it will be understood and appreciated that the generally U-shaped carriage means 48 is disposed beneath and is slidable and reciprocable along the frame means 24, with such sliding and reciprocating movement being restrained and guided by the engagement, operative or direct, of the carriage flanges 52 with the frame sides 28.

The rake means 22 includes a laterally extending arcuately curved metallic member 54 having a convex forward surface and a concave rearward surface. The upper end of the rake 54 is suitably attached to the carriage means 48, as for instance, by attaching plates 56 connected between the top of the rake 54 and the sides 52 of the carriage means. A series of spaced tines 58 are formed on the rake, such tines projecting downwardly from some intermediate portion of the rake body to the bottom edge thereof. It will thus be understood that the tines or teeth 58 are generally rearwardly directed due to the arcuate configuration of the rake member 54.

In the embodiment of FIGS. 1–3, the power means 26 includes a gasoline operated engine 60, mounted upon the frame means 24 adjacent the rear end thereof. This engine 60 has a depending driven shaft 62 and a blade 64 is mounted adjacent the lower end of this shaft. A hood or cowl means 66 protectively surrounds the blade 64, beneath the rear end of the frame means 24, and a discharge outlet means 68 is provided in the cowl tangentially of the path of rotation of the blade 64. A suitable bag or basket, designated B, can be attached to this discharge outlet means 68 to collect the debris tangentially directed through the outlet means 68 due to the vacuum created by rotation of the blade 64 within the hood 66. It will thus be apparent that the motor 60, the shaft 62, the attached blade 64, and the surrounding hood 66, form a more or less conventional power operated rotary lawnmower, of which a variety of different types are known in the prior art and sold commercially.

The power means 26 of the present invention also includes a driving pulley 70 fixed upon the shaft 62 from the engine 60 and hence rotatable therewith. A somewhat larger pulley 72 is mounted at the forward end of the frame means 24 upon a shaft 74 which is preferably located medially between the sides 28 of the frame means 24. A continuous driving belt or chain 76 is reeved over the pulleys 70 and 72 so that rotation of the pulley 70 imparts a corresponding rotation to the pulley 72. An idler 78 is mounted on the frame means 24, adjacent the pulley 72 to bias the driving belt 76 laterally toward the center of the frame means. A bearing 80 is provided on the frame means 24 and a shaft 82 depends downwardly through this bearing. The shaft 74 is likewise journaled in a bearing, and preferably, the shafts 74 and 82 are axially aligned with one another along the longitudinal central axis of the frame means 24.

By referring to FIG. 3, it will be seen that the shafts 74 and 82 each project beneath the top surface 30 of the frame means and at the lower end of each of these shafts, a similar sprocket 84 is mounted. A driving chain 86 is trained over the two sprockets 84, which are spaced apart from one another in the manner shown in FIG. 3, so that as the sprockets 84 rotate, the driving chain 86 is continually advanced in a prescribed direction. It will be understood that the driving of the chain 86 is thus controlled by the operation of the engine 60 since the engine 60 drives the pulley 70 and the belt 76 trained thereover. The belt 76 in turn, drives the pulley 72, the shaft 74 and the sprocket 84 coupled therewith.

As shown in FIGS. 3–5, the driving chain 86 includes a projecting means in the form of a stub shaft 88 having a cam roller 90 rotatably attached thereto. The roller 90 fits within a slot 92 formed within the bottom plate 50 of the carriage means 48, the lateral extent of the slot being substantially equivalent to the lateral distance between opposite sides of the driving chain 86. As is apparent from FIG. 4, when the sprockets 84 drive the chain 86 about its path, the projecting means 88, 90 is likewise moved along this path. Since the roller 90 is restrained within the guide slot 92 of the carriage means, the movement of the chain 86 is thus transmitted to the carriage means to create a reciprocating movement of the carriage means and the rake means attached thereto. In FIG. 4, the carriage means 48 has been shown, diagrammatically, in two different positions, one of such positions having the guide slot disposed at the forward end of the chain. The total longitudinal path of movement is, of course, the longitudinal width of the driving chain taken along the axis extending through the shafts 74 and 82. In other words, the groove 92 can move from a maximum forward position, as shown in FIG. 4, to a similar rearward position at the opposite end of the driving chain 86. Thus, as the driving chain 86 continues to rotate along its prescribed path, the carriage means 48 is reciprocated back and forth and hence the rake means 22 carried by the carriage means is also reciprocated.

Referring again to FIG. 1, and also to FIG. 2, it will be noted that an upstanding bracket 94 is provided on the frame means 24 adjacent the engine 60. A lever 96 has its lower end pivotally mounted to the bracket and has its upper portion pivotally attached to an elongated actuating arm 98 which in turn pivotally attaches to a bowed strip 100 coupled to the front axle 36 of the apparatus. By adjusting the handle 96 forwardly or rearwardly, the bowed strip 100 is selectively rotated to a particular position, and this rotation serves to cam the front end of the assembly up or down to thereby adjust the height of the rake means 54. An actuating cable could be connected from the top of the lever 96 to the pushing handle 44 to enable the operator to adjust the height while holding the handle 44. Alternatively, a somewhat more simple height adjusting arrangement is illustrated by providing a series of adjustment apertures 102 along the bracket 94. It will be understood that the handle 96 carries an inwardly projecting pin which fits within one of the apertures 102, and when it is desired to adjust the height of the rake, one need only pull the handle 96 outwardly to disengage the pin from one aperture 102 and rotate the handle until the pin aligns with a different aperture 102, thereafter releasing the handle to enable the pin to enter the aperture.

While the apparatus described hereinabove related to a combined unit wherein the power operated rake means was utilized in conjunction with the rotary lawn mowing means, it should be understood that the invention itself is not limited to this particular combination. Instead, in its broadest aspects, the invention merely relates to the power operated rake means itself, as will now be described in connection with FIGS. 6 and 7. It is believed that the combination of the power operated rake means with the rotary mower means, as previously described, represents the particular combination and assembly having the broadest and most versatile degree of utility, but nevertheless, in certain instances, it may be desirable only to produce a raking or thatching operation, without any cutting or suction means, and accordingly, in such an instance, one would use the embodiments shown in FIGS. 6 and 7.

In the embodiment of FIG. 6, the frame means 24 is illustrated in a highly simplified form, merely consisting of a pair of longitudinally extending side channel means 28. The axles 36 and 40 for the ground engaging wheels extend transversely across the frame means and are suitably coupled therewith by any conventional type of connection. The carriage means 48 with the rake means 22 attached thereto is similar to that described hereinabove, and is reciprocable along the side channels 28 of the frame in the manner previously described. The power means 26 can consist of any suitable type of driving motor or engine, but it will be understood that the shaft 106 which is rotated by this engine, carries affixed thereto, a crank arm 108. The free end of the crank arm is pivotally connected at 110 to a link 112 which has its opposite end pivotally attached at 114 to the underside 50 of the carriage means 48. Thus, as the motor shaft 106 rotates, it swings the crank arm 108 through a circular path and because the movement of the carriage means is constrained due to the cooperation between the side flanges of the carriage means and the side members of the frame means, the rotary motion of the crank arm 108 is converted into reciprocating motion of the rake means 22.

In the embodiment of FIG. 7, a crank arm type assembly is also used, the difference being that the FIG. 7 modification uses a crank arm assembly operative in a vertical plane whereas the FIG. 6 assembly used a crank arm assembly operative in a horizontal plane. In FIG. 7, the crank arm designated 116 is attached to an enlarged crank wheel 118, disposed in a vertical plane at the front of the frame means 24 and driven by a suitable power means 26 also mounted at the front of the frame means. If desired, the motor or engine forming the power means 26 can drive the wheel 118 directly. Alternatively, as shown, the motor means can drive a small pinion 120 which engages with teeth 122 formed peripherally on the wheel 118. In any event, the end of the crank arm 116 is pivotally connected at 124, by a knuckle connection, to a link 126 which is itself pivotally connected at 128 to a projecting yoke 130 extending forwardly and upwardly from the front of the carriage means 48. Thus, as the crank wheel 118 rotates and swings the crank arm 116 in a circular path, the carriage means 48 will be reciprocated due to the fact that its movement is constrained by interengagement between the flanges of the carriage means and the side channels 28 of the frame means.

Referring now to FIGS. 8(a), 8(b) and 8(c), there is shown therein, in diagrammatic form, one forward and return stroke of the rake means 22. It will, of course, be understood that the rake means is rapidly reciprocated back and forth, while at the same time, the entire assembly 20 is being pushed or propelled across the ground being treated, but nevertheless it will be seen that in its simplest form, the rake means moves from a forward position shown in FIG. 8(a) to a rearward position shown in 8(b). By the time that the rake means 22 reaches its rearward position of FIG. 8(b) it will have accumulated a considerable pile of debris designated D. As aforementioned, this debris consists mainly of dead grass although it also includes any twigs, leaves, or other matter which was entrained with or lying upon the grass on the lawn being raked. Due to the concave configuration of the rear surface of the rake means 22, most of the debris D will be disposed behind such concave surface, although a portion of the debris will be trapped between the tines 58 of the rake means and hence a small amount of the debris will be disposed in front of the rake means. However, as the rake means moves from its rearward position of FIG. 8(b) back to its forward position of FIG. 8(c), the convex configuration of the forward surface of the rake serves to assure that any debris trapped between the tines 58 will be withdrawn. Thus, the debris itself is left in a small pile at the rearward position, as shown in FIG. 8(c).

It will thus be understood that the rake means will collect and leave small piles or ridges of the debris D upon the lawn being treated. These ridges or piles of debris can be collected by a suitable sweeper means if merely a rake assembly, such as that shown in FIGS. 6 and 7, is used. However, if the preferred embodiment of FIGS. 1–3 is used, the rotating blade 64 will create a vacuum which will pick up the piles of debris and propel the same tangentially through the outlet means 68 and into a collecting receptacle B.

While the foregoing detailed description has set forth a preferred embodiment of the invention and two possible modifications thereof, it will be understood that various other changes and modifications apparent to those skilled in the art may be made, particularly in connection with drive means for reciprocating the rake. There are a large variety of known expedients for converting rotary motion into translating or reciprocating motion and any one of these expedients could be utilized to reciprocate the carriage means 48 and the rake means 22 carried thereby. Also, the lawn treating device of the present invention can be readily attached to existing forms of power mowers now available commercially. Nevertheless, it will be understood that the apparatus described in the foregoing detailed description does accomplish the objects set forth at the outset hereof but that various changes may be made therein without departing from the spirit and scope of the invention as defined in the appended claims.

What is claimed is:

1. A power operated lawn treating device comprising: supporting frame means adjacent said forward end rearward end;

first ground engaging wheel means connected with said supporting frame means adjacent said forward end thereof and second ground engaging wheel means connnected with said supporting frame means adjacent said rearward end thereof to enable said supporting frame means to be propelled across a lawn;

rake means having a convex forward surface and a concave rearward surface, said rake means including a plurality of spaced tines engageable in grass on said lawn;

means movably mounting said rake means beneath said supporting frame means;

power means operatively engageable with said rake means to reciprocate said rake means beneath said supporting frame means between a forward position and a rearward position;

said rake mounting means limiting said forward position of said rake means to a location behind said forward end of said supporting frame means and limiting said rearward position of said rake means to a location in advance of said rearward end of said supporting frame means;

said rake means collecting debris between said tines and within said concave rear surface as said power means moves said rake means from said forward to said rearward position;

said debris being deposited at said rearward position and being withdrawn from between said tines as said power means moves said rake means from said rearward position to said forward position;

a housing attached beneath said supporting frame means adjacent said rearward end thereof;

rotatable blade means within said housing;

said rotatable blade means being disposed rearwardly of said rearward position of said rake means so that all reciprocating movement of said rake means occurs in front of said blade means;

said blade means being operably connected with and rotated by said power means to create a suction within said housing to lift said debris collected and deposited by said rake means;

said housing including discharge outlet means through which debris lifted by said rotation of said blade means is discharged.

2. The device defined in claim 1 wherein said frame means includes a pair of longitudinally extending channel members and wherein said means movably mounting said rake means includes a carriage means supporting said rake means and slidable longitudinally along said channel members.

3. The device defied in claim 2 wherein said power means includes a continuous driving loop operatively engageable with said carriage means to slidably reciprocate said carriage means and said rake means supported thereby.

4. The device defined in claim 3 wherein said carriage means includes a transversely extending guide slot and wherein said driving loop includes a projecting element engaged within said guide slot.

5. The device defined in claim 1 wherein said power means includes a motor and a motor driven shaft, said shaft being connected with said blade means and also being connected with said means movably mounting said rake means whereby rotation of said shaft causes said reciprocating movement of said rake means and said rotating movement of said blade means.

References Cited

UNITED STATES PATENTS

| | | | |
|---|---|---|---|
| 2,242,922 | 5/1941 | Poynter | 56—27UX |
| 2,751,741 | 6/1956 | Carson | 56—27 |
| 2,807,126 | 9/1957 | Bennett | 56—202UX |
| 2,984,961 | 5/1961 | Judkins | 56—27 |
| 3,143,842 | 8/1964 | Mattson et al. | 56—202 |
| 3,205,643 | 9/1965 | Dunham | 56—26 |
| 3,406,761 | 10/1968 | Ryan | 56—27 |
| 3,417,554 | 12/1968 | Sudhoff | 56—27 |

LOUIS G. MANCENE, Primary Examiner

J. A. OLIFF, Assistant Examiner

U.S. Cl. X.R.

56—27